United States Patent [19]

Lindlar et al.

[11] Patent Number: 4,533,282
[45] Date of Patent: Aug. 6, 1985

[54] MILLING CUTTER

[75] Inventors: Wilhelm Lindlar, Cologne; Günter Wermeister, Düsseldorf, both of Fed. Rep. of Germany

[73] Assignee: Santrade Limited, Lucerne, Switzerland

[21] Appl. No.: 497,416

[22] Filed: May 24, 1983

[30] Foreign Application Priority Data

May 29, 1982 [DE] Fed. Rep. of Germany ....... 3220363

[51] Int. Cl.³ .............................................. B26D 1/00
[52] U.S. Cl. ......................................... 407/38; 407/41; 407/50
[58] Field of Search ...................... 407/38, 39, 40, 41, 407/44, 49, 50

[56] References Cited

U.S. PATENT DOCUMENTS

| 3,195,376 | 7/1965 | Bader | 407/49 |
| 3,339,257 | 9/1967 | Hargreaves et al. | 407/38 |
| 3,616,507 | 11/1971 | Wirfelt | 407/40 |

FOREIGN PATENT DOCUMENTS

| 2543605 | 4/1976 | Fed. Rep. of Germany | 407/41 |
| 2500620 | 7/1976 | Fed. Rep. of Germany | 407/44 |

Primary Examiner—Leonidas Vlachos
Attorney, Agent, or Firm—Burns, Doane, Swecker & Mathis

[57] ABSTRACT

A milling cutter for metal cutting having a cutter body (1) in which inserts (5) are retained in recesses (3) solely by spring means (7-11). An edge (27) of the insert (5) is supported in the recess (3) on an axially displaceable adjusting device (6) which has a somewhat inclined contact surface (13). The insert (5) is adjustable without the need of loosening any clamping device.

6 Claims, 7 Drawing Figures

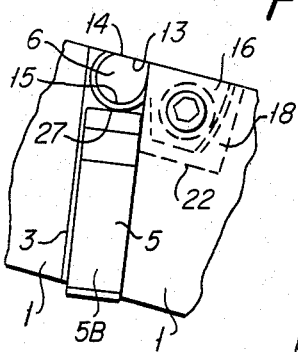
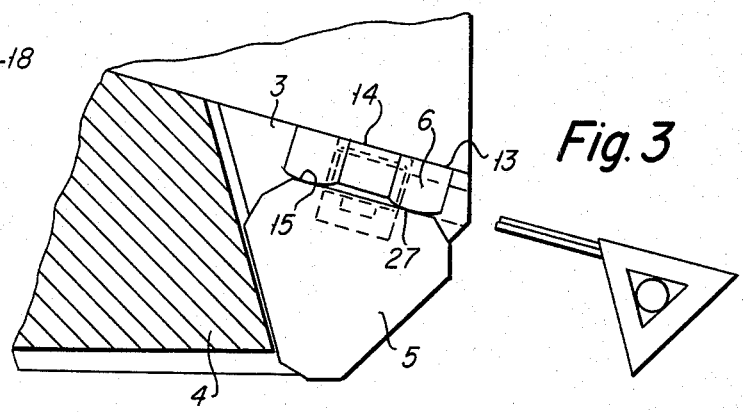
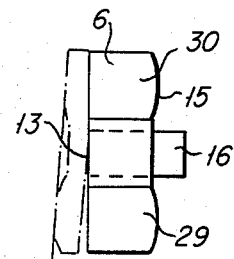
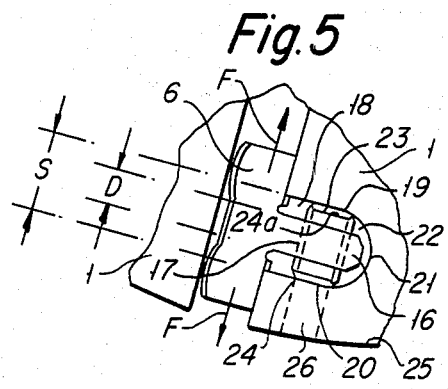
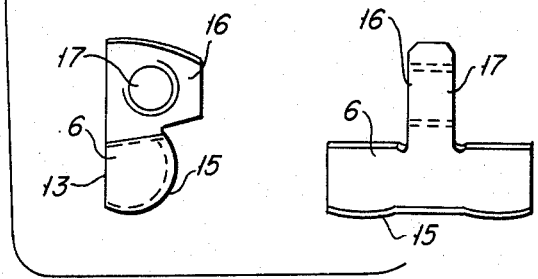
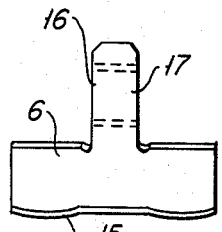
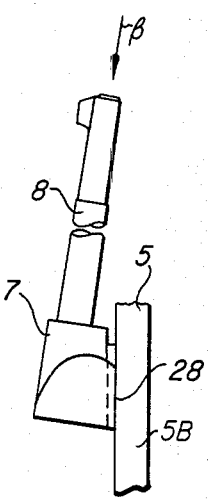

MILLING CUTTER

This invention relates to milling cutters of the type using removably clamped cutting inserts and is concerned with improvements in means and method for adjusting such inserts in such tools.

In connection with similar cutters for rough- and fine cutting of metal surfaces, it takes a lot of time to position the inserts with negative cutting geometry and less than 1° in supplementary cutting edge angle. The positioning of the great number of inserts in the circumference of the cutter body has to be done with great accuracy to obtain a precise cutting length with good surface smoothness.

It is an object of the present invention to provide a milling cutter in which the positioning of the inserts is made in a time-saving and precise way. The precise positioning of the insert is simply done by only one movement of the hand and the changing or indexing of the insert is made simplier than hitherto been possible. The solution of the task is a construction that is simple and that demands no more space than hitherto known arrangements for clamping inserts in cutter recesses.

The milling cutter according to the present invention discloses the advantage that only one screw tap has to be rotated in a threaded boring of a shoulder of a pin to axially displace the somewhat inclined pin by means of a simple tool. With this movement the insert is positionable in the cutter body. The positioning of the inserts is easy and quick to do as the axial movement of the pin follows upon a rotation of the screw tap while the insert is retained in the recess exclusively by spring means.

Another advantage of the present positioning device is the instant fixing of the insert after the desired position have been reached, ie there is no risk of displacing the insert at clamping after positioning as that moment does not arise. The insert in the cutter body according to the present invention remains under constant contact pressure from the spring means during the positioning.

The positioning of inserts by means of movable wedges is previously known through the U.S. Pat. No. 4,311,418 which discloses an adjusting device for a milling cutter that, however, is more difficult and time-consuming to handle than the present invention. It is also known through our own U.S. Pat. No. 3,616,507 to retain inserts in milling ciutter recesses by spring means which, however, presents only two positions in the recess to the insert, which means a limitation of the positioning possibilities. Thus, the present invention is a combination of the two above mentioned characteristics. In the present invention the insert is positioned while the spring means clamps the insert. It is possible to position the insert without using any considerable force to overcome the force of the spring means. The spring means develop enough holding force to counteract the centrifugal forces arising during the rotation of the milling cutter so it keeps the insert in the insert pocket. The invention facilitates mounting and clamping of the insert and improves the positional accuracy. The invention avoids the conventional way of assemblying: loosen the tightening device—fit the insert—tighten the tightening device.

In the following the invention will be described in connection with the attached drawings in which:

FIGS. 3-6 show the position of an insert and an adjusting pin with a screw-threaded shoulder, and FIG. 7 shows a pull rod, a wedge-shaped device and a part of an insert.

Figure 1:
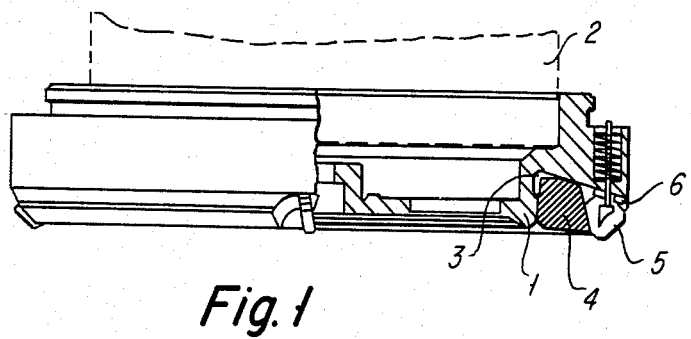
FIG. 1 shows a milling cutter, partial in section.
Figure 2:
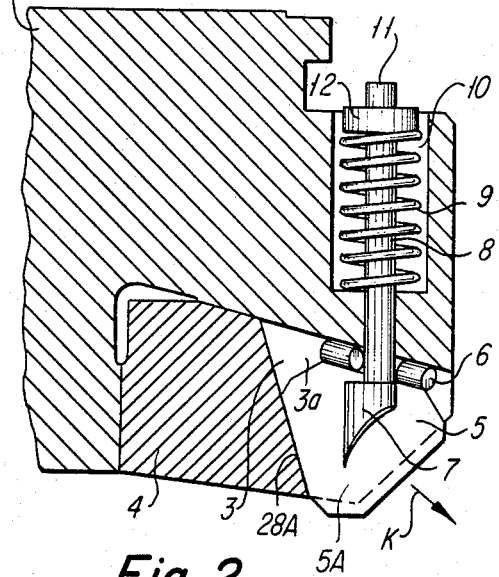
FIG. 2 shows an enlarged view of a spring means and an adjusting device.

The cutter body 1 is firmly connected to a turning body 2 which is connected to a machine spindle (not shown). The annular cutter body 1 comprises radial recesses 3 in which a support body 4, an insert 5 and an adjusting pin 6 are placed. The insert includes a pair of side faces 5A which are interconnected by a series of edge faces 5B. In FIG. 2 the triangular insert 5 is held by a wedge-shaped device 7 which has a pull rod 8 that is influenced by a spring 9. The spring 9 is accomodated in a housing 10 in the cutter body 1. The wedge-shaped device 7 and the pull rod 8 are inclined relative to the insert 5 so that the insert 5 is held against a supporting surface 3a of the recess 3. The inclination is in FIG. 2 chosen so that the lower part of the pull rod 8 is closer to the viewer than the upper part 11, which reaches outside of the disc 12 that is functioning as a spring dolly.

The insert 5 is slidable along a locating surface 28A which extends in a direction having radial and axial components.

The adjusting pin 6 is essentially cylindric but is planar on the side 13 by which the adjusting pin 6 is contacting a top reaction surface 14 of the recess (FIGS. 3, 4 and 6). A part 15 of the adjusting pin 6 that is contacting the insert 5, is cylindric in section but the ends 29, 30 of the part 15 may be crowned in the longitudinal direction, as seen in FIGS. 3 and 6. Perpendicular to the middle of the adjusting pin 6 is formed a shoulder 16 which is provided with a threaded boring 17 that is parallel to the axis of the adjusting pin 6. The planar side 13 of the adjusting pin 6 inclines an angle $\alpha$ about 1-2 degrees relative to said axis, so that the adjusting pin 6 forms a wedge that lies between the insert 5 and the top surface 14.

In the upper part of the supporting surface 3a an opening 18 is formed which partly reaches along the recess 3 and that is limited by the side surfaces 19, 20, a concave face surface 21 and the bottom surface 22. FIG. 5 shows that the thickness D of the shoulder 16 is considerably less than the width S of the opening 18. A screw tap 23 is in threaded engagement with the boring 17 of the shoulder 16 in order to move the adjusting pin 6, direction given by the arrow F in FIG. 5, upon rotation of the screw tap 23, while the ends 24, 24a of the screw tap 23 are held by the side surfaces 19, 20 of the opening 18. To rotate the screw tap 23 which is provided with a polygonal hole or a slot, the outer side 25 of the cutter body 1 is able to receive a tool which can reach the screw tap 23 through a hole 26 which is coaxial with the screw tap 23 and the boring 17. The hole 26 has a smaller cross sectional width than the end 24, so that the rim of the end 24 contacts the side surface 20.

The insert 5 is in permanent line-contact with the crowned ends 29, 30 of the adjusting pin 6 by one of the edges 27, which means that the adjusting pin 6 need not be very carefully machined and yet easily obtaining line-contact even after indexing of the insert 5.

The insert 5 is held by the wedge-shaped device 7 that is inclined an angle $\beta$ (FIG. 7) relative to the insert 5 and that lies against the insert 5 by the wedge surface 28. The insert 5 is hereby under constant contact pressure from the wedge-shaped device 7.

When positioning the insert 5 in the direction according to the arrow K in FIG. 2 which has components in the axial and radial directions, it remains under constant pressure from the wedge-shaped device 7 which is influenced by the spring 9, whereby the wedge-like adjusting pin 6 is moved by means of the screw tap 23. The adjusting pin 6 is placed in the cutter body 1 with the most narrow end closest to the axis of the cutter body, while the thicker end faces the outside 25. By moving the tapered adjusting pin 6 radially inwards by means of the screw tap 23 along a linear path having axial and radial components, and which is parallel to the reaction surface 14 and supporting surface 3a, a movement of the insert 5 is obtained in the direction according to the arrow K in FIG. 2, while a movement of the adjusting pin 6 radially outwards enables the insert 5 to be moved in the opposite direction of the arrow K by tapping, while the insert 5 is influenced by the spring means 7-11.

Considering the great number of inserts in the cutter body 1 this invention leads to a time-saving and precise positioning of each insert 5, as only the screw tap 23 has to be rotated to move the adjusting pin 6 that positions the under pressure lying insert 5. To loosen the insert 5 from the cutter body 1 only one push on the upper part 11 of the pull rod 8, against the force of the spring 9, is required (in the axially downward direction in FIG. 2).

We claim:

1. A milling cutter comprising:
    a cutter body rotatable about an axis and containing a plurality of circumferentially spaced recesses,
        each said recess including a reaction surfce, a support surface and a locating surface, said locating surface having axial and radial directional components relative to said axis,
    a plurality of cutting inserts supported in respective ones of said recesses,
        each of said inserts comprising a pair of opposing side faces interconnected by a plurality of edge faces,
    a plurality of clamp means for yieldably pressing said inserts against said support surfaces, each clamp means comprising:
        a wedge member engaging one of said side faces of an associated insert, and
        spring means arranged to yieldably urge said wedge member against said one side face to push one of said edge faces toward said reaction surface and to push the other of said side faces against said support surface in a direction oriented generally transversely with respect to said axis,
    a plurality of adjusting means for adjustably moving respective ones of said inserts in a direction of adjustment having radial and axial components, each said adjusting means comprising:
        a wedge pin wedgingly disposed in a respective recess and bearing against said reaction surface and said one of said edge faces of an associated insert, with another of said edge faces slidably engaging said locating surface, said wedge pin being movable linearly along a path oriented parallel to said reaction surface and said support surface and at an inclination relative to said one edge face, and having radial and axial components, said wedge pin being held against rotation about said path as an axis,
        said wedge pin including a laterally extending shoulder which includes a threaded bore extending substantially parallel to said path,
        a threaded screw threadedly connected in said bore and aligned with a hole in said cutter body to be accessible to a tool from the outside to be rotated, means restraining said screw against movement along its longitudinal axis such that in response to rotation of said threaded screw in one direction of rotation said wedge pin is moved inwardly along said path to adjustably displace said insert outwardly along said locating surface in said direction of adjustment by means of the engagement between said wedge element and said one edge face, said insert sliding frictionally relative to said wedge member of said clamping means during displacement in said direction, with said wedge member retaining said insert in its adjusted position simultaneously with termination of said displacement.

2. A milling cutter according to claim 1, wherein said pin includes a curved peripheral portion engaging said one edge face and a flat peripheral portion engaging said reaction surface of said cutter body.

3. A milling cutter according to claim 1, wherein a width of said shoulder is less than a width of said opening to enable said shoulder to be displaced within said opening.

4. A milling cutter according to claim 3, wherein the length of said screw exceeds said width of said shoulder.

5. A milling cutter according to claim 1, wherein the diameter of said hole is less than the diameter of said screw.

6. A milling cutter according to claim 1, wherein said cutter body includes an opening into which said shoulder extends, said opening including first and second side surfaces mutually spaced in the direction of said bore so as to be disposed at opposite ends thereof, said hole extending through said second side surface, opposite ends of said screw engaging said first and second side surfaces, respectively, whereby said first and second side surfaces define said means restraining said screw against longitudinal movement.

* * * * *